US010554703B2

(12) United States Patent
Abuelsaad et al.

(10) Patent No.: US 10,554,703 B2
(45) Date of Patent: *Feb. 4, 2020

(54) NOTIFYING ONLINE CONFERENCE PARTICIPANT OF PRESENTING PREVIOUSLY IDENTIFIED PORTION OF CONTENT

(71) Applicant: INTERNATIONAL BUSINESS MACHINES CORPORATION, Armonk, NY (US)

(72) Inventors: Kelly Abuelsaad, Poughkeepsie, NY (US); Kulvir Singh Bhogal, Fort Worth, TX (US); Lisa Seacat DeLuca, San Francisco, CA (US); Soobaek Jang, Hamden, CT (US)

(73) Assignee: International Business Machines Corporation, Armonk, NY (US)

(*) Notice: Subject to any disclaimer, the term of this patent is extended or adjusted under 35 U.S.C. 154(b) by 225 days.

This patent is subject to a terminal disclaimer.

(21) Appl. No.: 14/821,243

(22) Filed: Aug. 7, 2015

(65) Prior Publication Data

US 2015/0358371 A1  Dec. 10, 2015

Related U.S. Application Data

(63) Continuation of application No. 14/540,173, filed on Nov. 13, 2014, now Pat. No. 9,137,182, which is a
(Continued)

(51) Int. Cl.
*G06F 15/16* (2006.01)
*H04L 29/06* (2006.01)
(Continued)

(52) U.S. Cl.
CPC ........ *H04L 65/403* (2013.01); *H04L 12/1818* (2013.01); *H04L 43/04* (2013.01);
(Continued)

(58) Field of Classification Search
CPC .............................. H04L 65/403; H04L 51/24
(Continued)

(56) References Cited

U.S. PATENT DOCUMENTS 7,194,186 B1   3/2007  Strub et al.
8,019,069 B1   9/2011  Cyriac
(Continued)

OTHER PUBLICATIONS

IBM, A Method to Register Interesting Topics, Check Real-Time Meeting Status and Be Notified Before the Interesting Topics, IP.Com PriorArtDatabase, Dec. 14, 2007, 4 pages.
(Continued)

*Primary Examiner* — Kevin T Bates
*Assistant Examiner* — Nazia Naoreen
(74) *Attorney, Agent, or Firm* — Isaac J. Gooshaw, Esq.; George S. Blasiak, Esq.; Heslin Rothenberg Farley & Mesiti PC

(57) ABSTRACT

In a method for notifying a participant of an online conference of when a portion of content will be presented during the online conference, a computer receives at least one data item identifying the portion of content. The computer determines an estimate of a time at which the portion of content will be presented and the level of confidence in the accuracy of the estimate. The computer transmits a user notification including the estimate of the time at which the portion of content will be presented and the level of confidence in the accuracy of the estimate.

20 Claims, 4 Drawing Sheets

Related U.S. Application Data continuation of application No. 13/413,039, filed on Mar. 6, 2012, now Pat. No. 8,918,470.

(51) Int. Cl.
    *H04L 12/58*     (2006.01)
    *H04L 12/18*     (2006.01)
    *H04L 12/26*     (2006.01)
    *H04M 3/56*     (2006.01)

(52) U.S. Cl.
    CPC .............. *H04L 51/04* (2013.01); *H04L 51/24* (2013.01); *H04M 3/567* (2013.01); *H04L 12/1822* (2013.01)

(58) Field of Classification Search
    USPC ........................................................ 709/206
    See application file for complete search history.

(56) References Cited

U.S. PATENT DOCUMENTS

| | | |
|---|---|---|
| 8,918,470 B2 | 12/2014 | Abuelsaad |
| 9,092,533 B1 * | 7/2015 | Demathieu ......... G06F 16/9562 |
| 9,137,182 B2 | 9/2015 | Abuelsaad |
| 2006/0224430 A1 * | 10/2006 | Butt ............... G06Q 10/063116 705/7.16 |
| 2008/0147706 A1 * | 6/2008 | Anglin .................. G06Q 10/10 |
| 2011/0038472 A1 | 2/2011 | Gartner et al. |
| 2013/0238713 A1 | 9/2013 | Abuelsaad et al. |

OTHER PUBLICATIONS

Office Action for U.S. Appl. No. 13/413,039 dated Jan. 31, 2014, 20 pages.
Notice of Allowance for U.S. Appl. No. 14/540,173 dated May 7, 2015.
Network Working Group, "RTP: A Transport Protocol for Real-Time Applications" *The Internet Society*, 2003.
P. Mell, et al. "The Nist Definition of Cloud Computing", NIST Special Publication 800-145, Sep. 2011, Gaithersburg, MD.
Global Dossier Report, U.S. Appl. No. 14/821,243, filed Aug. 7, 2015, dated Sep. 30, 2019.
List of IBM Patent and/or Patent Applications treated as related for U.S. Appl. No. 14/821,243, filed Aug. 7, 2015, dated Sep. 30, 2019.

* cited by examiner

NOTIFYING ONLINE CONFERENCE PARTICIPANT OF PRESENTING PREVIOUSLY IDENTIFIED PORTION OF CONTENT

CROSS-REFERENCE TO RELATED APPLICATIONS

This application is a continuation of co-pending U.S. patent application Ser. No. 14/540,173 filed Nov. 13, 2014, entitled, "NOTIFYING ONLINE CONFERENCE PARTICIPANT OF PRESENTING IDENTIFIED PORTION OF CONTENT" which is incorporated herein by reference in its entirety, which is a continuation of U.S. patent application Ser. No. 13/413,039, filed Mar. 6, 2012, entitled "NOTIFYING ONLINE CONFERENCE PARTICIPANT OF PRESENTING IDENTIFIED PORTION OF CONTENT," which is incorporated herein by reference in its entirety.

TECHNICAL FIELD

The present invention relates to online conferencing systems, and more specifically, to notifying an online conference participant of when an identified portion of content will be presented during an online conference.

BACKGROUND

Online conferencing systems are widely used to provide collaborative sessions between two or more participants, by allowing the participants to exchange video- and/or audio-content, voice and instant messages, etc. An online conferencing system can be integrated with a variety of collaboration applications, including, for example, media sharing applications, instant messaging applications, video- and audio-streaming applications, and telephony applications.

SUMMARY

In one embodiment, there is provided a method for notifying a participant of an online conference of when a portion of content will be presented during the online conference. The method comprises the step of a computer receiving at least one data item identifying the portion of content. The method further comprises the step of the computer determining an estimate of a time at which the portion of content will be presented. The method further comprises the step of the computer determining the level of confidence in the accuracy of the estimate. The method further comprises the step of the computer using the level of confidence in an accuracy of the estimate in transmitting to the online conference participant a notification including the estimate of the time at which the portion of content will be presented.

In another embodiment, there is provided a computer program product for notifying a participant of an online conference of when a portion of content will be presented during the online conference. The computer program product comprises one or more computer-readable tangible storage devices. The computer program product further comprises program instructions, stored on at least one of the one or more storage devices, to receive at least one data item identifying the portion of content. The computer program product further comprises program instructions, stored on at least one of the one or more storage devices, to determine an estimate of a time at which the portion of content will be presented. The computer program product further comprises program instructions, stored on at least one of the one or more storage devices, to determine the level of confidence in the accuracy of the estimate. The computer program product further comprises program instructions, stored on at least one of the one or more storage devices, using the level of confidence in an accuracy of the estimate to transmit to the online conference participant a notification including the estimate of the time at which the portion of content will be presented.

In a yet another embodiment, there is provided a computer system for notifying a participant of an online conference of when a portion of content will be presented during the online conference. The computer system comprises one or more processors and one or more computer-readable tangible storage devices. The computer system further comprises program instructions, stored on at least one of the one or more storage devices for execution by at least one of the one or more processors, to receive at least one data item identifying the portion of content. The computer system further comprises program instructions, stored on at least one of the one or more storage devices for execution by at least one of the one or more processors, to determine an estimate of a time at which the portion of content will be presented. The computer system further comprises program instructions, stored on at least one of the one or more storage devices for execution by at least one of the one or more processors, to determine the level of confidence in the accuracy of the estimate. The computer system further comprises program instructions, stored on at least one of the one or more storage devices for execution by at least one of the one or more processors, using the level of confidence in an accuracy of the estimate to transmit to the online conference participant a notification including the estimate of the time at which the portion of content will be presented.

BRIEF DESCRIPTION OF THE SEVERAL VIEWS OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION

Embodiments of the present invention recognize that, of all content to be presented during an online conference, a participant in the conference may be interested in only one or more portions of the content. For example, the participant may be interested only in a presentation and/or discussion of several slides out of a relatively large presentation file. In another example, the participant may be interested only in a presentation and/or discussion of one or more agenda items. Embodiments of the present invention provide for notifying an online conference participant of when an identified portion of content will be presented during an online conference.

Figure 1:
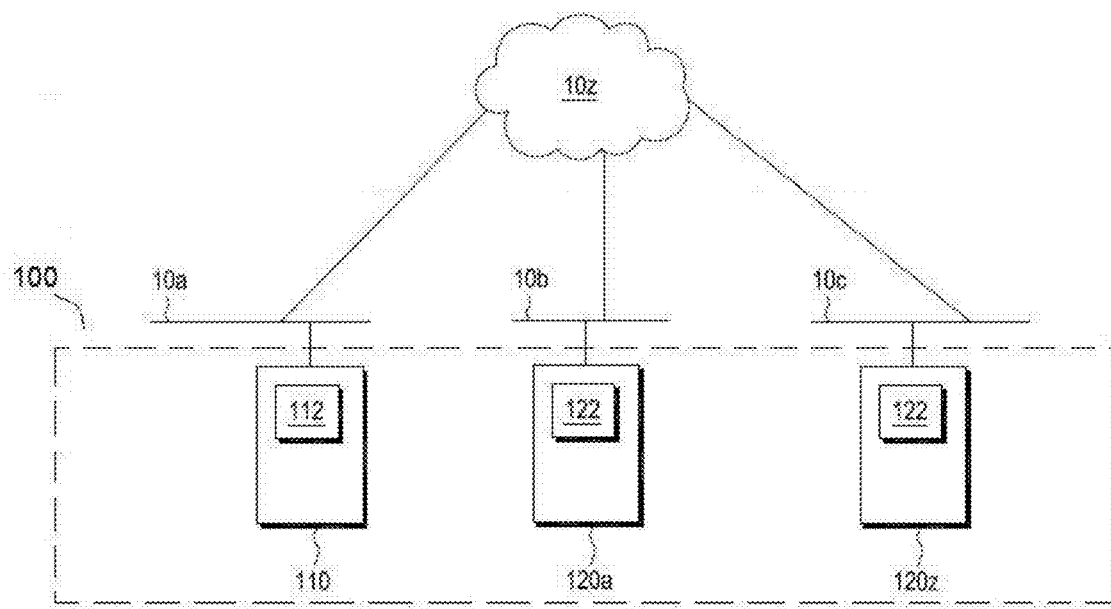
FIG. 1 depicts a block diagram of one embodiment of a computer system for notifying an online conference participant of when a portion of content previously identified by the online conference participant will be presented during an online conference.

FIG. 1 depicts a block diagram of one embodiment of a computer system for notifying an online conference participant of when a portion of content identified by the online conference participant will be presented during an online conference. Computer system 100 can comprise a collaboration server computer 110 provided by at least one computer configured to execute an online conferencing server program 112. Computer system 100 can further comprise two or more conference participant computers 120a-120z communicatively coupled to the collaboration server computer 110 via one or more networks 10a-10z. Each of the conference participant computers 120a-120z can be configured to execute a respective online conferencing client program 122.

A "computer" herein shall refer to a programmable device for data processing, including a central processing unit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In a yet another embodiment, a computer can be provided by a personal computer (PC) running Microsoft® Windows® operating system. Microsoft and Windows are trademarks of Microsoft Corporation in the United States, other countries, or both. In a yet another embodiment, a computer can be provided by a portable communication device, e.g., a smartphone running the Android™ operating system. Android is a trademark of Google Inc. in the United States, other countries, or both.

As noted herein supra, a conference participant computers 120a-120z can each be provided, for example, by a PC, or by a portable device equipped with a wireless communication interface (e.g., a smart phone). It is not necessary that a device's primary function involve video- and/or audio-conferencing in order to be considered a conference participant computer; for example, a cellular telephone, a smart phone, or a PDA that is capable of audio- and/or video-input/output can be referred to as a conference participant computer for purposes of this disclosure.

A "network" herein shall refer to a set of hardware and software components implementing one or more communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks. While FIG. 1 does not show network routers, switches, firewalls, load balancers and other equipment necessary to enable network communications between collaboration server computer 110 and the conference participant computers 120a-120z, a skilled artisan would appreciate the fact that various methods of interconnecting networks 10a-10z are within the scope of this disclosure.

In one embodiment, networks 10a-10z can carry Internet Protocol (IP) traffic. In the embodiment of FIG. 1, each of computers 110 and 120a-120z has at least one network interface and is connected to one network. In another embodiment (not shown), the computer 110 and/or the computers 120a-120z can have two or more network interfaces and can be connected to two or more networks.

An online conference carried by online conferencing server program 112 can in one embodiment support a video channel between two or more conference participants, thus allowing the conference participants to view video content. The video channel can be carried out using one or more standard and/or proprietary application-level protocols over TCP and/or UDP transport.

In one embodiment, an online conference carried by online conferencing server program 112 can support an audio channel between two or more conference participants, thus allowing the conference participants to listen to audio content and/or to exchange instant voice messages. The audio channel can be carried out using one or more standard (e.g., of a VoIP protocol family) and/or proprietary application-level protocols over TCP and/or UDP transport.

In one embodiment, an online conference carried by online conferencing server program 112 can further support an instant messaging (IM) channel between two or more conference participants, thus allowing the conference participants to exchange IM messages. The IM channel can be carried out using one or more standard and/or proprietary application-level protocols over TCP and/or UDP transport.

In one embodiment, an online conference carried by online conferencing server program 112 can further support integration with a telephone system (e.g., a Plain Old Telephone Service (POTS) system or VoIP-based telephone system), thus allowing voice traffic to be carried by a phone conference held simultaneously with the online conference. The phone system integration can be carried out using one or more standard and/or proprietary application-level protocols over TCP and/or UDP transport.

In a further aspect, an online conference carried by online conferencing server program 112 can comprise several identifiable portions of content which can be presented in a pre-defined sequence. In one embodiment, the portions can comprise an ordered sequence of documents (e.g., a Microsoft® PowerPoint® presentation can comprise two or more slides identifiable by slide numbers and/or slide titles). PowerPoint® is a registered trademark of Microsoft Corporation in the United States, other countries, or both. In one embodiment, the portions can comprise two or more agenda items identifiable by item numbers and/or item titles. A skilled artisan would appreciate the fact that other types identifiable portions of content which can be presented in a pre-defined sequence are within the scope of this disclosure.

A conference agenda and/or presentation materials can be distributed to the conference participants prior to, or at the start of, the online conference. Having reviewed the conference agenda and/or the presentation materials, a conference participant can decide that he or she is interested only in one or more portions of content to be presented. For example, a conference participant may be interested only in a presentation and/or discussion of several slides out of a large presentation file. In another example, a conference participant may be interested only in a presentation and/or discussion of one or more agenda items. In one embodiment, online conferencing client program 122 can present a graphical user interface (GUI) to be used by a conference participant to identify his or her interest in one or more portions of content. The GUI can be configured so that the conference participant can further select one or more notification methods to be used to notify the conference participant of when the identified one or more portions of content will be presented. The notification methods can include, for example, an audio notification (e.g., a voice notification or an audio alert using a user configurable sound pattern), an IM notification, a visual notification (e.g., a popup window), an SMS notification, and/or a voice notification via a phone call to a user defined phone number.

In one embodiment, the GUI can be configured with an option that the conference participant can choose to receive a phone call notification, the phone call notification including an option to connect to a phone conference. Online conferencing server program 120 or online conferencing client program 122 can transmit a message to a phone conferencing system causing the phone conferencing system to initiate a phone call to the conference participant's pre-defined phone number. When the phone call is responded to, online conferencing server program 120 or online conferencing client program 122 can notify the responding party of the identified portion of content being presented in a conference within a specified period of time, and present the conference participant an option to be connected to the phone conference (e.g., by pressing a designated key on the phone keyboard). In another embodiment, the GUI can be configured with an option that the conference participant can choose to receive a computer-based notification, the computer-based notification including an option to connect to an online conference. Online conferencing server program 120 can transmit a message to participant computer 120a causing participant computer 120a to start online conferencing client program 122 and display a message notifying the user of computer 120a of the identified portion of content being presented in an online conference within a specified period of time. The notification message window can comprise a user input control (e.g., a button) which, if selected or activated by the user of participant computer 120a, can indicate the user's preference to be connected to the online conference. Responsive to the user of computer 120a selecting or activating the user input control, online conferencing client program 122 can connect to the online conference.

In a further aspect, the GUI can be configured so that the conference participant can further select a notification lead time (i.e., the desired latency between the notification and an estimated time of the presentation of an identified portion of content).

Figure 2:
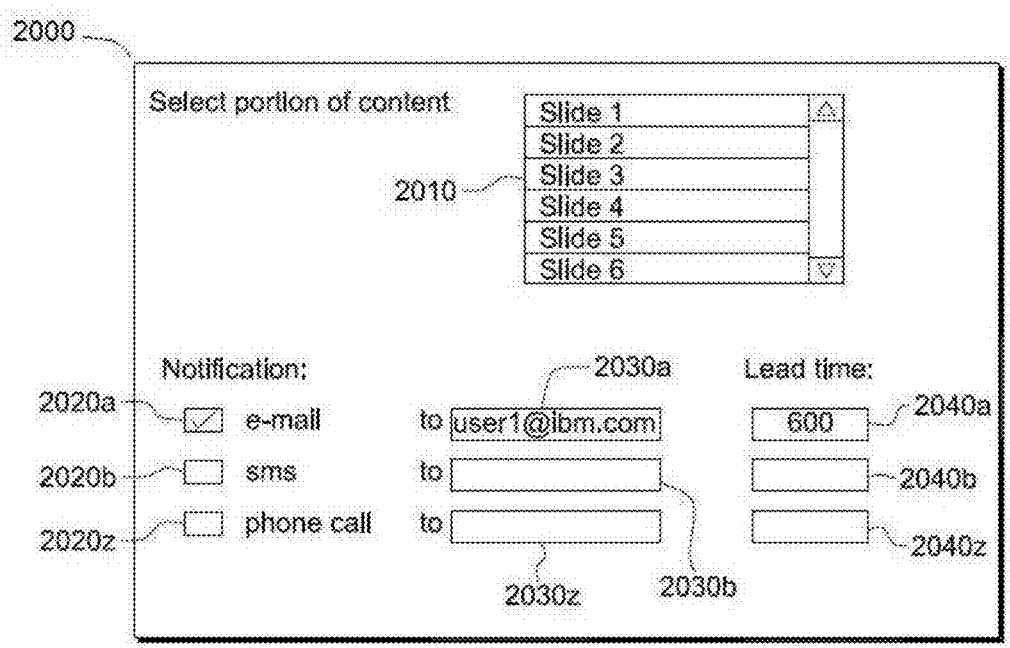
FIG. 2 depicts one embodiment of a graphical user interface configured to receive a conference participant's preferences with respect to a portion of contents to be presented at an on-line conference, notification methods, and notification lead times.

FIG. 2 depicts one embodiment of a graphical user interface (GUI) configured to receive a conference participant's preferences with respect to a portion of contents to be presented at an on-line conference, notification methods, and notification lead times. GUI 2000 can comprise a drop-down list 2010 of content portions to be presented, with one or more of the portions being selectable by the conference participant as one or more portions of interest. GUI 2000 can further comprise two or more check-boxes 2020a-2020z corresponding to various notification methods. GUI 2000 can further comprise two or more notification method parameter input fields 2030a-2030z configured to receive the conference participant's selection of notification method parameters (e.g., a phone number for a telephone notification or short message service (SMS) notification, or an e-mail address for an e-mail notification). GUI 2000 can further comprise two or more notification lead time input fields 2040a-2040z configured to receive the conference participant's selection of notification lead times. A skilled artisan would appreciate the fact that other methods of presenting a GUI configured to receive a conference participant's preferences with respect to the portion of contents of interest, notification methods, and notification lead times are within the scope of this disclosure.

In one embodiment, a conference participant can map in GUI 2000, or a separate GUI, notification lead times to different levels of confidence in an estimate of a time at which a portion of content identified by the conference participant will be presented during an online conference. For example, higher notification lead times can be mapped to lower levels of confidence in the estimate, and lower notification lead times can be mapped to higher levels of confidence in the estimate. To illustrate, the conference participant can map a notification lead time of 5 minutes to confidence levels 85% and more, a notification lead time of 10 minutes to confidence levels from 60% to 85%, and a notification lead time of 20 minutes to confidence levels below 60%.

Figure 3:
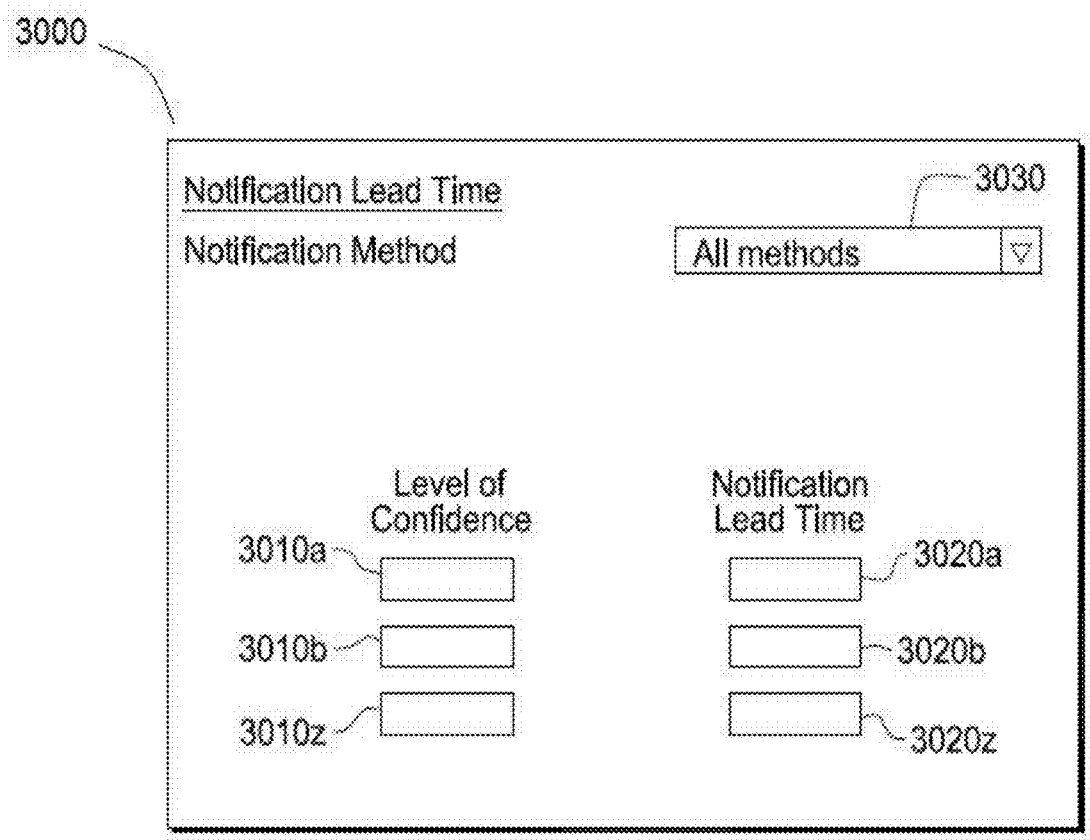
FIG. 3 depicts one embodiment of a graphical user interface configured to receive a user's preferences with respect to a mapping of notification lead time to levels of confidence in an accuracy of an estimate of a time at which a portion of content identified by the user will be presented during an online conference.

FIG. 3 depicts one embodiment of a graphical user interface configured to receive a conference participant's preferences with respect to a mapping of notification lead time to levels of confidence in an accuracy of an estimate of a time at which a portion of content identified by the conference participant will be presented during an online conference The GUI 3000 can comprise one or more input fields 3010a-3010z configured to receive the values of the level of confidence in the accuracy of the estimate. In one embodiment, the input fields 3010a-3010z can be configured to receive ranges of the confidence level values. GUI 3000 can further comprise one or more input fields 3020a-3020z configured to receive the notification lead time values corresponding to the level of confidence values inputted into the fields 3010a-3010z. In one embodiment, GUI 3000 can further comprise a drop-down list 3030 of notification methods, so that the conference participant can select different mappings of the notification lead time to the level of confidence in the accuracy of the estimate for different notification methods.

Online conferencing client program 122 can receive the conference participant's selections of the portion(s) of content of interest, the notification method(s), and/or the notification lead time(s).

In one embodiment, online conferencing client program 122 can forward the conference participant's selections to online conferencing server program 120. Online conferencing server program 120 can determine an estimate of the time at which the identified portion(s) of content will be presented during the online conference and the level of confidence in the accuracy of the estimate, and can transmit to the conference participant a notification including the estimate of the time at which the portion of content will be presented and the level of confidence in the accuracy of the estimate.

Figure 4:
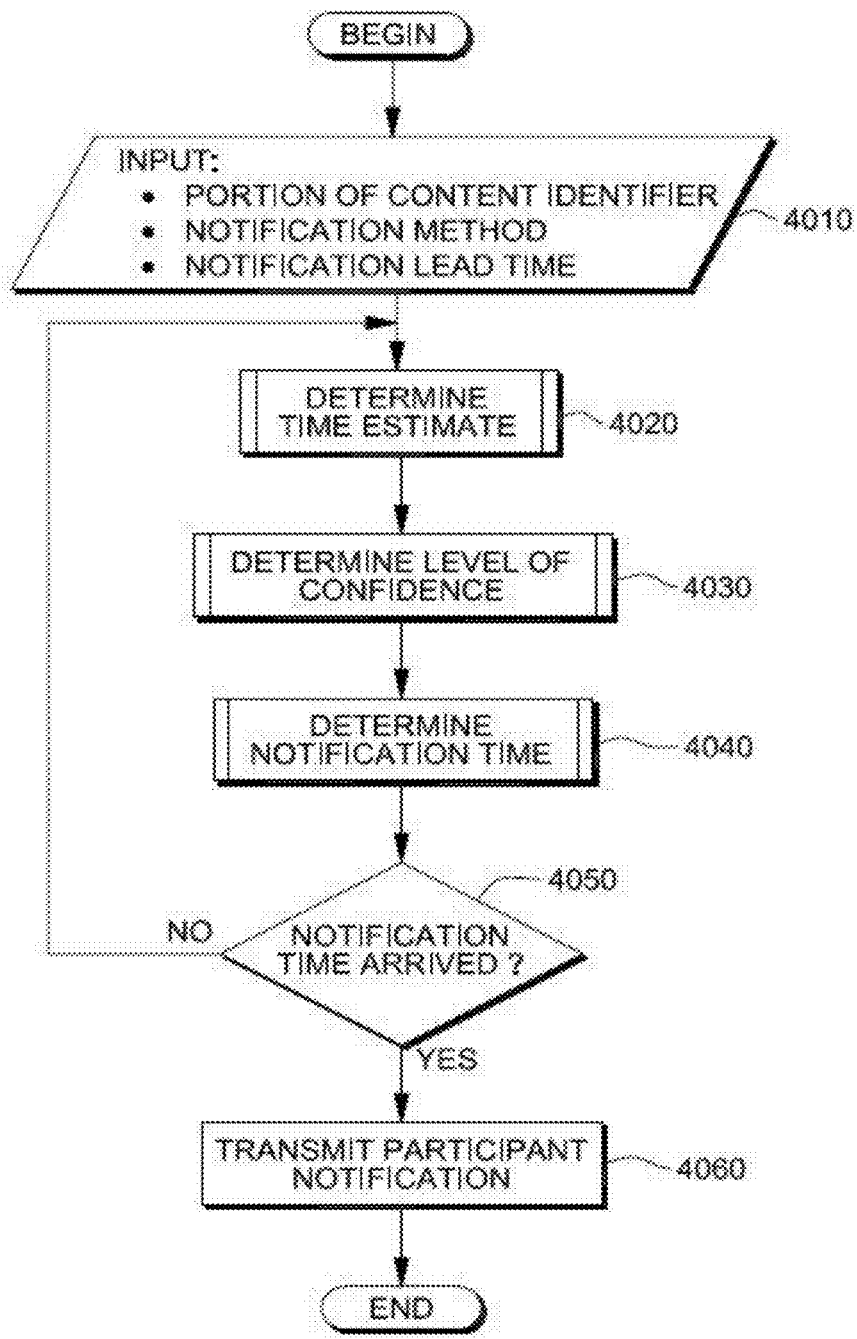
FIG. 4 depicts a flowchart describing one embodiment of a method for notifying an online conference participant of when an identified portion of content will be presented during an online conference.

FIG. 4 depicts a flowchart describing one embodiment of a method for notifying an online conference participant of when an identified portion of content will be presented during an online conference. Processing commences at block 4010 by an online conferencing program (such as online conferencing server program 120 or online conferencing client program 122) receiving one or more data items identifying the portion of content. The online conferencing program can further receive one or more data items identifying a notification method and/or a mapping of a notification lead time to a level of confidence in an accuracy of an estimate of a time at which the identified portion of content will be presented during the online conference.

At block 4020, the online conferencing program can determine the estimate of the time at which the identified portion of content will be presented during the online conference. In one embodiment, the estimate can be a single time value, e.g., 4:30 pm. In another embodiment, the estimate of time can be a time range, e.g., 4:30 pm±15 minutes, or 4:15 pm to 4:45 pm.

In one embodiment, the online conferencing program can determine the estimate by analyzing one or more data items related to portions of content that are scheduled to be presented during the online conference before the identified portion of content. For example, if the identified portion of content of interest is a slide of a multi-slide presentation, then the online conferencing program can estimate the time at which the slide of interest will be presented based on the number of slides which have already been presented and the time period within which the slides have been presented. In another example, the online conferencing program can estimate the time at which the slide of interest will be presented based on the sequential number of the slide which is currently being presented and the time period within which at least all slides having a number lower then the sequential number of the slide which is currently being presented have been presented.

In one embodiment, the online conference can comprise an audio channel. The online conferencing program can monitor the audio channel and use voice recognition methods to extract the information pertinent to presentation progress, e.g., the presenter's announcing the number of the slide being currently presented. The online conferencing program can then use the obtained information to estimate the time at which the slide of interest will be presented.

In one embodiment, the online conference can comprise a video channel. The online conferencing program can monitor the video channel and use image recognition methods to extract the information pertinent to the presentation progress, e.g., the number of the slide being currently presented. The online conferencing program can then use the obtained information to estimate the time at which the slide of interest will be presented.

In one embodiment, the online conference can comprise an IM channel. The online conferencing program can monitor the IM channel and extract the textual information pertinent to the presentation progress, e.g., the number of the slide being currently presented. The online conferencing program can then use the obtained information to estimate the time at which the slide of interest will be presented.

In a further aspect, the online conferencing program can estimate the time at which the identified portion of content will be presented based on data describing informational complexity of one or more portions of content to be presented before the content portion of interest. The informational complexity can be represented by, for example, a number of words in a textual portion of the document being presented. In another example, the informational complexity can be represented based on the ratio of the areas occupied by textual information within a document to areas occupied by graphical information within the document. In one embodiment, a complexity rating of a presentation slide can be defined as the ratio of the slide areas occupied by textual information to the slide areas occupied by graphical information.

In another aspect, the presentation delivery software employed by the online conference participants can allow the presenter(s) to rehearse their presentation and record the rehearsal timing for each portion of content (e.g., for each presentation slide). The online conferencing program can, in one embodiment, receive the rehearsal timing data via a user input (e.g., in a table format). In another embodiment, the online conferencing program can receive the rehearsal timing data via a data file. In another embodiment, the online conferencing program can receive the rehearsal timing data via a service, such as a web service or grid service). The online conferencing program can then use the rehearsal timing data for estimating the time at which the identified portion of content will be presented during the online conference.

At block 4030, the online conferencing program can determine a level of confidence in the accuracy of the estimated time. In one embodiment, the level of confidence in the accuracy of the estimated time can be represented by a probability of the identified portion of content being presented at the estimated time, for example, a 95% probability that the identified portion of content will be presented at 4:30 pm. A skilled artisan would appreciate the fact that other methods of representing the level of confidence in the accuracy of the estimated time are within the scope of this disclosure.

In one embodiment, the level of confidence in the accuracy of the estimated time can be determined based on the method selected for determining the estimate at block 4020, e.g., using a look-up table containing a pre-defined mapping of methods to the levels of confidence. In a further aspect, the look-up table can be stored in the memory accessible by the online conferencing program.

In another embodiment, the level of confidence in the accuracy of the estimated time can be determined based on analyzing one or more statistical parameters of the data set used for determining the estimate at block 4020. In one example, the level of confidence can be calculated based on the standard deviation of the data set used for determining the estimate at block 4020. For a data set including two or more time intervals taken to present two or more portions of content preceding the portion of content identified by the conference participant, the level of confidence can be calculated as 100% minus the percentage ratio of the standard deviation to the average value of the data set. A skilled artisan would appreciate the fact that other methods of calculating the level of confidence in the accuracy of the estimated time are within the scope of this disclosure.

At block 4040, the online conferencing program can determine a notification time at which to transmit, to the online conference participant, a notification notifying the online conference participant of when the identified portion of content will be presented during the online conference. In one embodiment, the online conferencing program can determine the notification time based on the notification method selected by the conference participant. In another embodiment, the online conferencing program can determine the notification time based on the notification lead time pre-defined by the conference participant for the currently determined level of confidence in the accuracy of the estimate.

At block 4050, the online conferencing program can, responsive to determining that the notification time has not yet arrived, loop back to the block 4020 to re-determine, as the online conference progresses, the estimate.

At block 4060, the online conferencing program can, responsive to determining that the notification time has arrived, transmit the notification to the conference participant. As noted herein supra, methods of transmitting the notification, for example, transmitting an audio notification (e.g., a voice notification or an audio alert using a user configurable sound pattern), transmitting an IM notification, transmitting a visual notification (e.g., a popup window), transmitting an SMS notification, and/or transmitting a voice notification via a phone call to a user defined phone number. In one embodiment, at block 4040 the online conferencing program can determine the notification time utilizing a table including a standard notification lead period for each of the notification methods.

In a further aspect, the notification can include the estimate of the time at which the portion of content identified by the conference participant will be presented and the level of confidence in the accuracy of the estimate.

Upon completing operations described in block 4060, the online conferencing program can terminate.

Figure 5:
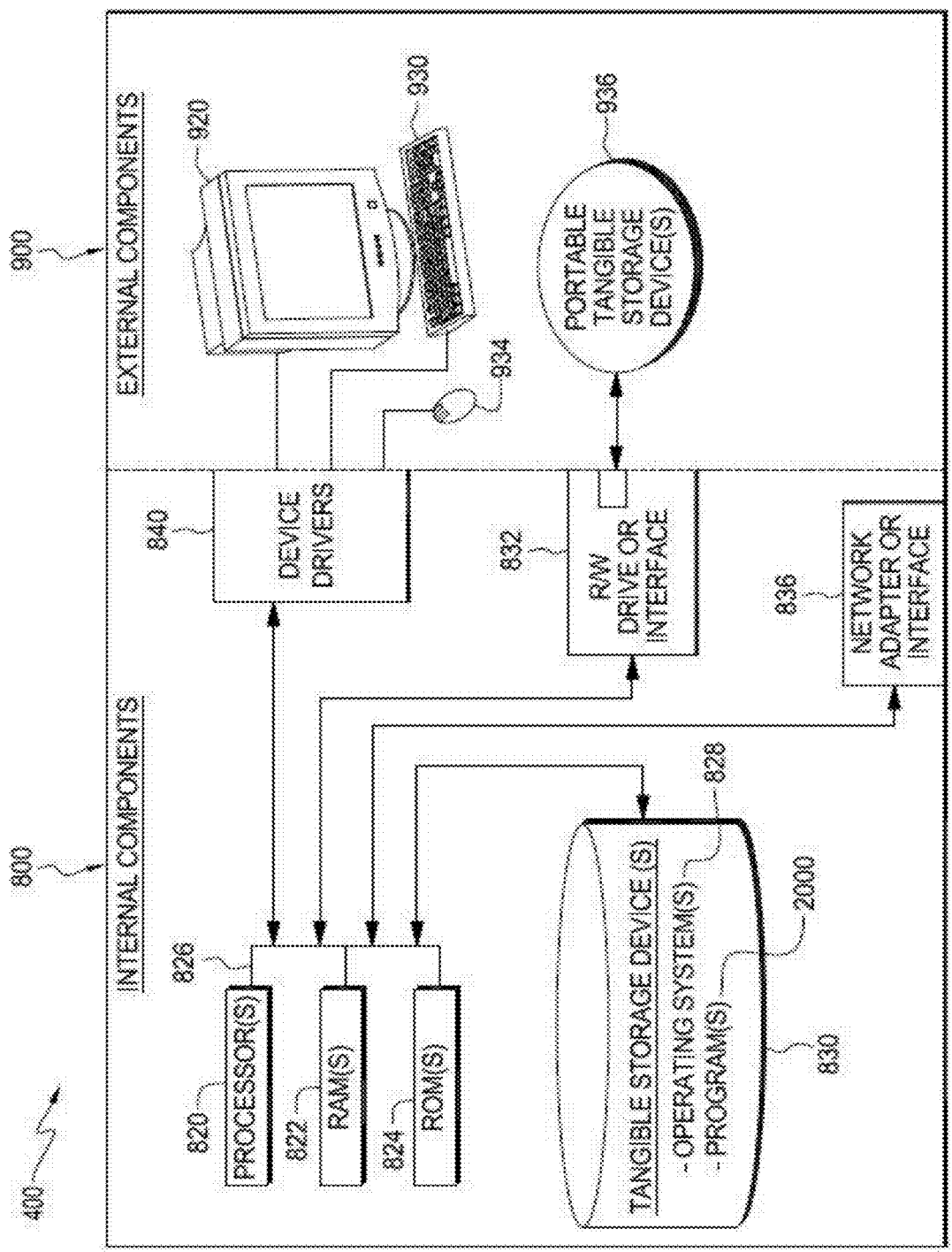
FIG. 5 is a block diagram of hardware and software components of a computer in accordance with one embodiment of the present invention.

FIG. 5 is a block diagram of hardware and software components of a computer 400 in accordance with one embodiment of the present invention. In one embodiment, computers 110 and 120 can be provided in accordance with computer 400 as shown in FIG. 5.

Computer 400 includes a set of internal components 800 and a set of external components 900. Set of internal components 800 include one or more processors 820, one or more computer-readable RAMs 822 and one or more computer-readable ROMs 824 connected on one or more buses 826, and one or more operating systems 828 and one or more computer-readable tangible storage devices 830. The one or more operating systems 828 and one or more programs 2000 are stored on one or more of the computer-readable tangible storage devices 830 for execution by one or more of the processors 820 via one or more of the one or more RAMs 822 (which typically include cache memory). In one embodiment, one or more programs 2000 include online conferencing server program 120. In one embodiment, one or more programs 2000 include online conferencing client program 122. In one embodiment, each of the computer-readable tangible storage devices 830 can be provided by a magnetic disk storage device of an internal hard drive. Alternatively, each of the computer-readable tangible storage devices 830 can be provided by a semiconductor storage device such as ROM 824, EPROM, flash memory or any other computer-readable tangible storage device that can store a computer program and digital information.

Set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. One or more programs 2000 can be stored on one or more of the portable computer-readable tangible storage devices 936, read via R/W drive or interface 832 and loaded into hard drive 830.

Set of internal components 800 also includes a network adapter or interface 836 such as a TCP/IP adapter card. One or more programs 2000 can be downloaded to computer 400 from an external computer via a network (for example, the Internet, a local area network or other, wide area network) and network adapter or interface 836. From the network adapter or interface 836, one or more programs 2000 can be loaded into hard drive 830. The network may comprise copper wires, optical fibers, wireless transmission, routers, firewalls, switches, gateway computers and/or edge servers.

Set of external components 900 includes a computer display monitor 920, a keyboard 930, and a computer mouse 934. Sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Programs 2000 can be written in various programming languages including low-level, high-level, object-oriented or non object-oriented languages. Alternatively, the functions of programs 2000 can be implemented in whole or in part by computer circuits and other hardware (not shown).

Based on the foregoing, a computer system, a method and a program product have been disclosed for notifying an online conference participant of when a previously identified portion of content will be presented during an online conference. However, numerous modifications and substitutions can be made without deviating from the scope of the present invention. Therefore, the present invention has been disclosed by way of example and not limitation.

What is claimed is:

1. A method comprising:
a computer receiving at least one data item identifying a portion of content of an online conference;
the computer determining an estimate of a time at which the portion of content will be presented;
the computer determining a level of confidence in an accuracy of the estimate; and
the computer using the level of confidence in an accuracy of the estimate in transmitting a notification to a participant of the online conference, wherein the transmitting a notification to a participant of the online conference includes transmitting to the participant a user interface control that permits the participant to join the online conference.

2. The method of claim 1, wherein the computer determining the estimate of the time at which the portion of content will be presented is performed based on one or more data items related to one or more portions of content that are scheduled to be presented before the portion of content.

3. The method of claim 2, wherein the one or more data items include a time spent rehearsing a presentation of the one or more portions of content that are scheduled to be presented before the portion of content.

4. The method of claim 2, wherein the one or more data items include informational complexity of the one or more portions of content that are scheduled to be presented before the portion of content.

5. The method of claim 1, wherein the online conference comprises at least one channel selected from the group consisting of an audio channel, a video channel, and an IM channel; and wherein the computer determining the estimate of the time at which the portion of content will be presented is performed based on monitoring the at least one channel selected from the group consisting of an audio channel, a video channel, and an IM channel.

6. The method of claim 1, further comprising, before the computer transmitting the notification to the participant of the online conference, the following: the computer receiving a user input indicating a lead time; and the computer determining a time at which to transmit the notification to the participant of the online conference based on the lead time; wherein the computer transmitting the notification to the participant of the online conference is performed at the time at which to transmit the notification.

7. The method of claim 1, further comprising, before the computer transmitting the notification to the participant of the online conference, the following: the computer receiving a user input comprising a mapping of lead time values to confidence level values; and the computer determining a time at which to transmit the notification to the participant of the online conference based on the lead time corresponding to the determined level of confidence; wherein the computer transmitting the notification to the participant of the online conference is performed at the time at which to transmit the notification.

8. The method of claim 7, wherein the lead time values include a first lead time value and a second lead time value that is less than the first lead time value, wherein the first lead time value is mapped to a first confidence level value of the confidence level values, and wherein the second lead time value is mapped to a second confidence level value of the confidence level values that is greater than the first confidence value.

9. The method of claim 1, wherein the portion of content comprises a document of an ordered sequence of documents.

10. The method of claim 1, wherein the portion of content comprises a video frame of an ordered sequence of video frames, and wherein the notification comprises at least one of the following selected from the group consisting of an IM, a phone call, an e-mail message.

11. The method of claim 1, wherein the determining an estimate of a time at which the portion of content will be presented includes the computer examining content of one or more of an audio channel, a video channel, or an IM channel during a presentation of the online conference.

12. The method of claim 1, wherein the method includes presenting a graphical user interface (GUI) allowing a conference participant to designate content of interest of the online conference.

13. The method of claim 1, wherein the computer is provided by a collaboration server computer, wherein the collaboration server computer is in network communication with a plurality of participant computers, wherein a certain participant computer of the participant computers is associated to the participant, wherein the receiving at least one data item, the determining an estimate, the determining a level of confidence, the using the level of confidence and the transmitting the notification are performed by the collaboration server computer, wherein based on an input by the participant using the user interface control, the certain participant computer is connected to the online conference.

14. The method of claim 1, wherein the estimate of a time at which the portion of content will be presented defines an estimated time at which the portion of content will be presented, wherein the portion of content is relevant content relevant to the participant, wherein the notification including the user interface control permitting the participant to join the online conference identifies the portion of content that is relevant content relevant to the participant and specifies the estimated time at which the portion of content will be presented, wherein a notification time is based on the estimated time at which the portion of content will be presented, wherein the transmitting the notification to a participant of the online conference is performed in dependence on the computer determining the estimated time at which the portion of content that is relevant content relevant to the participant will be presented, and wherein the method includes delaying the transmitting of the notification including the user interface control permitting the participant to join the online conference until the notification time so that the user interface control permitting the participant to join the online conference is not available for use by the participant to join the online conference prior to the computer determining the estimated time at which the portion of content that is relevant content relevant to the participant will be presented.

15. A computer program product, the computer program product comprising: one or more computer-readable tangible storage devices; program instructions, stored on at least one of the one or more storage devices, to receive at least one data item identifying a portion of content of an online conference; program instructions, stored on at least one of the one or more storage devices, to determine an estimate of a time at which the portion of content will be presented; program instructions, stored on at least one of the one or more storage devices, to determine a level of confidence in an accuracy of the estimate; and program instructions, stored on at least one of the one or more storage devices, using the level of confidence in an accuracy of the estimate to transmit a notification to a participant of the online conference, wherein the level of confidence is determined using a memory-stored data structure, the memory-stored data structure mapping different processes of examining data of the online conference used to determine the estimate of a time at which the portion of content will be presented to different levels of confidence.

16. The computer program product of claim 15, wherein the different processes of examining data include each of following: (a) examining a number of slides that have been presented and a time period within which slides have been presented, (b) examining a sequential number of a slide which is currently being presented and a time period within which at least all slides having a number lower than the sequential number of the slide which is currently being presented have been presented, (c) monitoring an audio channel and using voice recognition methods to extract information pertinent to presentation progress, (d) monitoring a video channel and using image recognition methods to extract information pertinent to the presentation progress, (e) monitoring an IM channel and extracting textual information pertinent to the presentation progress, (f) examining data describing informational complexity of one or more portions of content, wherein informational complexity is represented by a number of words in a textual portion of a document being presented, (g) examining data describing informational complexity of one or more portions of content, wherein the informational complexity is represented based on a ratio of areas occupied by textual information within a document to areas occupied by graphical information within the document, and (h) examining a data file that records rehearsal timing data, wherein the rehearsal timing data includes timing data for portions of content of a rehearsed presentation.

17. The computer program product of claim 15, wherein the different processes of examining data include examining data describing informational complexity of one or more portions of content, wherein the informational complexity is represented based on a ratio of areas occupied by textual information within a document to areas occupied by graphical information within the document.

18. The computer program product of claim 15, wherein within the memory-stored data structure, the process of (a) examining a number of slides that have been presented and a time period within which slides have been presented is mapped to a first level of confidence, the process of (b) examining a sequential number of a slide which is currently being presented and a time period within which at least all slides having a number lower than the sequential number of the slide which is currently being presented have been presented is mapped to a second level of confidence, the process of (c) monitoring an audio channel and using voice recognition methods to extract information pertinent to presentation progress is mapped to a third level of confidence, the process of (d) monitoring a video channel and using image recognition methods to extract information pertinent to the presentation progress is mapped to a fourth level of confidence, the process of monitoring (e) an IM channel and extracting textual information pertinent to the presentation progress is mapped to a fifth level of confidence, the process of (f) examining data describing informational complexity of one or more portions of content, wherein informational complexity is represented by a number of words in a textual portion of a document being presented is mapped to a sixth level of confidence, the process of (g) examining data describing informational complexity of one or more portions of content, wherein the informational complexity is represented based on a ratio of areas occupied by textual information within a document to areas occupied by graphical information within the document is mapped to a seventh level of confidence, and the process of (h) examining a data file that records rehearsal timing data, wherein the rehearsal timing data includes timing data for portions of content of a rehearsed presentation is mapped to an eighth level of confidence, wherein the program instructions to transmit a notification to a participant of the online conference include program instructions to transmit to the participant a user interface control that permits the participant to join the online conference, wherein the computer is provided by a collaboration server computer, wherein the collaboration server computer is in network communication with a plurality of participant computers, wherein a certain participant computer of the participant computers is associated to the participant, wherein the program instructions to determine an estimate, the program instructions to determine a level of confidence, and the program instructions to transmit the notification are executed by the collaboration server computer, wherein based on an input by the participant using the user interface control, the certain participant computer is connected to the online conference.

19. The computer program product of claim 15, wherein the different processes of examining data include different processes of examining data selected from the group consisting of: (a) examining a number of slides that have been presented and a time period within which slides have been presented, (b) examining a sequential number of a slide which is currently being presented and a time period within which at least all slides having a number lower than the sequential number of the slide which is currently being presented have been presented, (c) monitoring an audio channel and using voice recognition methods to extract information pertinent to presentation progress, (d) monitoring a video channel and using image recognition methods to extract information pertinent to the presentation progress, (e) monitoring an IM channel and extracting textual information pertinent to the presentation progress, (f) examining data describing informational complexity of one or more portions of content, wherein informational complexity is represented by a number of words in a textual portion of a document being presented, (g) examining data describing informational complexity of one or more portions of content, wherein the informational complexity is represented based on a ratio of areas occupied by textual information within a document to areas occupied by graphical information within the document, and (h) examining a data file that records rehearsal timing data, wherein the rehearsal timing data includes timing data for portions of content of a rehearsed presentation.

20. A computer system for notifying a participant of an online conference of when a portion of content will be presented during the online conference, the computer system comprising:
  one or more processors and one or more computer-readable tangible storage devices;
  program instructions, stored on at least one of the one or more storage devices for execution by at least one of the one or more processors, to receive at least one data item identifying the portion of content;
  program instructions, stored on at least one of the one or more storage devices for execution by at least one of the one or more processors, to repeatedly determine, until a notification time, an estimate of a time at which the portion of content will be presented;
  program instructions, stored on at least one of the one or more storage devices for execution by at least one of the one or more processors, to determine a level of confidence in an accuracy of the estimate and to use the level of confidence to transmit to the participant of the online conference, at the notification time, a notification including the estimate of the time at which the portion of content will be presented and a user interface control that permits the participant to join the online conference.

* * * * *